US010540649B2

(12) United States Patent
Jardany et al.

(10) Patent No.: US 10,540,649 B2
(45) Date of Patent: *Jan. 21, 2020

(54) WEARABLE RFID DEVICE FOR USE IN AN EVENT-BASED INTERROGATION ZONE (71) Applicant: INTELLITIX TECHNOLOGIES INC., Montreal, Quebec (CA)

(72) Inventors: Barna Jardany, Szigetszentmiklos (HU); Gabor Remete, Urom (HU); Serge Grimaux, Prague (CZ)

(73) Assignee: Intellitix Technologies, Inc., Montreal, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,234

(22) Filed: May 20, 2015

(65) Prior Publication Data

US 2017/0132608 A1 May 11, 2017

Related U.S. Application Data (60) Provisional application No. 62/000,931, filed on May 20, 2014.

(51) Int. Cl.
*G06Q 20/40* (2012.01)
*G06Q 20/02* (2012.01)
(Continued)

(52) U.S. Cl.
CPC ..... *G06Q 20/3278* (2013.01); *G06K 7/10297* (2013.01); *G06K 19/0723* (2013.01);
(Continued)

(58) Field of Classification Search
CPC ...... G06Q 20/405; G06Q 20/40; G06Q 20/02; G06Q 20/32
(Continued)

(56) References Cited

U.S. PATENT DOCUMENTS 7,295,132 B2* 11/2007 Steiner .................. G01C 3/26
235/383
2006/0092072 A1* 5/2006 Steiner .................. G01C 3/26
342/46

(Continued)

FOREIGN PATENT DOCUMENTS

CA 2738160 A1 3/2010

*Primary Examiner* — Hai Tran
(74) *Attorney, Agent, or Firm* — White and Williams LLP (57) ABSTRACT A wearable RFID device is provided for use in an event-based interrogation zone. The zone contains terminals with RFID readers. The device has an element worn by a user and an attached or embedded RFID tag. The tag has stored data representing a UniqueID of the tag, and a stored funds balance. The tag is programmed to activate an otherwise inactive one of said terminals upon presentation of the tag to the RFID reader of said terminal in a first tap, and communicate its UniqueID to the terminal for validation. Upon validation and following a second tap of the tag at the RFID reader, the tag's stored funds balance can be changed by the amount of a transaction run through said terminal. A temporary installation of a system of RFID-based terminals and user-worn RFID devices is also provided for use within an event interrogation zone.

24 Claims, 7 Drawing Sheets (51) Int. Cl.
*G06Q 20/32* (2012.01)
*H04B 5/00* (2006.01)
*G06K 19/07* (2006.01)
*G06K 7/10* (2006.01)
*G07C 9/00* (2006.01)
*G06K 19/077* (2006.01)
*G06K 19/14* (2006.01)
*G06Q 30/06* (2012.01)

(52) U.S. Cl.
CPC ....... *G06K 19/07762* (2013.01); *G06K 19/14* (2013.01); *G06Q 30/0607* (2013.01); *G07C 9/00119* (2013.01); *H04B 5/0062* (2013.01)

(58) Field of Classification Search
USPC .......................................................... 705/44
See application file for complete search history.

(56) References Cited

U.S. PATENT DOCUMENTS

| | | | | |
|---|---|---|---|---|
| 2008/0249899 | A1* | 10/2008 | Nasser | G06Q 10/087 705/28 |
| 2011/0285502 | A1* | 11/2011 | Steinmetz | G06K 7/0008 340/5.61 |
| 2012/0084135 | A1* | 4/2012 | Nissan | G06Q 30/0238 705/14.38 |
| 2012/0313759 | A1* | 12/2012 | Markwitz | G06Q 10/087 340/10.1 |
| 2014/0278688 | A1* | 9/2014 | Sullivan | G06Q 10/06312 705/7.22 |
| 2015/0348384 | A1* | 12/2015 | Tam | G06K 7/10128 340/572.1 |

* cited by examiner

WEARABLE RFID DEVICE FOR USE IN AN EVENT-BASED INTERROGATION ZONE

CROSS-REFERENCE TO RELATED APPLICATIONS

This application claims the benefit of U.S. Provisional Patent Application No. 62/000,931, filed May 20, 2014 entitled "System and Method of Double Tap Transactions in Cashless RFID Payments," which is incorporated herein by reference in its entirety.

FIELD OF INVENTION

The field of invention is generally related to wearable RFID devices, and more particularly relates to RFID devices used for cashless electronic payments in a closed system.

BACKGROUND

Touchless and cashless transactions provide convenience and save time. Such transactions may use, for example, RFID (Radio-frequency identification) tags (e.g. in credit or debit cards). RFID tags allow for a "tap and go" style of payment because the information is transmitted wirelessly. Two-way radio transmitter-receivers called readers send a signal to the tag and read its response. In such a transaction the user is not required to sign a piece of paper or to enter the PIN number, and neither there is any verification of signature.

Radio-frequency identification (RFID) is the wireless non-contact use of radio-frequency electromagnetic fields to transfer data, for the purposes of automatically identifying and tracking tags attached to objects. The tags contain electronically stored information. Some RFID tags are powered by and read at short ranges (a few meters) via electromagnetic induction. Others types of RFID tags may use a local power source such as a battery, or else have no battery but collect energy from the interrogating electromagnetic field, and then act as a passive transponder to emit microwaves or UHF (ultra high frequency) radio waves. Unlike a bar code, the RFID tag does not necessarily need to be within line of sight of the reader, and may be embedded in an object.

RFID tags can be passive or active or battery-assisted passive. A passive tag is cheaper and smaller because it has no battery. An active tag has an on-board battery and periodically transmits its ID signal. A battery-assisted passive (BAP) tag has a small battery on board and is activated when in the presence of an RFID reader.

Tags may either be read-only, having a factory-assigned serial number that is used as a key into a database, or may be read/write, where object-specific data can be written into the tag by the system. Field programmable tags may be write-once, read-multiple; "blank" tags may be written with an electronic product code by the user.

Generally fixed RFID readers are set up to create a specific interrogation zone which can be tightly controlled. This allows a highly defined reading area for when tags go in and out of the interrogation zone. Mobile RFID readers may be hand-held or mounted on carts or vehicles.

Prior art "tap and go" style of payment systems designed to save time and make shopping easier have some inherent issues. For example RFIDs are prone to wireless identity theft, also known as contactless identity theft. Passive "skimming" of RFIDs allow card-skimming thieves to make fraudulent purchases with information read from RFID-enabled tags carried in pockets, purses or worn as wrist bands. Additionally the shoppers can be mistakenly charged when cards are accidentally scanned while still in their wallets. Furthermore that is a chance of a malicious scan where the fraudster taps another person's RFID tag to a terminal (reader) to pay.

This technology is also facing a high rate of chargebacks which are occurring as a result of friendly fraud. In such cases the transaction is authorized by the consumer but the consumer later attempts to fraudulently reverse the charges.

A dispute is a situation in which a customer questions the validity of a transaction that was registered to his/her account. Disputes can be genuine or fraudulent. In some cases customers knowingly launch a dispute with a financial institution e.g. a credit card company after having purchased an item willingly but later declaring that it was not them. Such fraud is aimed at obtaining goods without paying, or to obtain unauthorized funds from an account. A consumer may initiate a chargeback by contacting their issuing bank, and filing a substantiated complaint regarding one or more debit items on their statement.

In case of tap and go payments a customer may initiate a fraudulent dispute as the customer can claim that the scan was accidental, and they never intended the purchase or ever received the vended products or services. A merchant may fight a chargeback for transactions where the original invoice was signed by the consumer. But in case of tap and go payments there are neither signatures nor a PIN.

RFID technology is also currently used for access control (smart badges, etc.), for example, at events, concerts, tradeshows, conferences, exhibitions, etc. However, the technology has not been combined with payment RFID to enable participants to avoid dealing with multiple payment cards, cash, etc., in addition to such smart badges. There is also the risk of loss or theft when participants have to carry multiple valuable items in what are often crowded and bustling environments.

It would be desirable to provide a wearable RFID device for making various types of transactions in an event-based interrogation zone.

SUMMARY

Broadly speaking, the present invention relates to a system and method of electronic transactions, including touchless payments, using RFID tags embedded in wristbands or similar wearable items. For example, an RFID tag may be embedded in a wristband that is given to a consumer when visiting a certain event e.g. a conference or a tradeshow. The venue/event may be setup with one or more sales terminals with RFID readers, one or more RFID top-up terminals with RFID readers and a connected server (either on- or off-site) that can store a listing of valid UniqueIDs of the RFID tags, associated balances, age information, zone restriction/privileges information. The server is accessible by the sales terminals and the top-up terminals over a network for example a local area network (LAN).

Preferably, the system uses a of double tap payment method. In the initial state the sales terminal is in an inactive state. The consumer taps the RFID tag to the RFID reader. The RFID reader reads the RFID tag which activates the sales terminal. In one embodiment the sales terminal is only activated once a valid RFID tag has been tapped at the RFID reader by a consumer. This prevents a sales person from fraudulently adding any items unwanted by the consumer to the order. The validity of the RFID tag is checked by comparing the UniqueID of the RFID tag with the UniqueIDs stored in the database on the server. If RFID tag is valid, the sales person is permitted to add products being vended to the sales transaction. The consumer confirms the sale transaction with a second tap of the RFID tag to the RFID reader. The RFID tag may be validated a second time by comparing the UniqueID of the RFID tag captured with the first tap with the UniqueID of the RFID tag captured with the second tap. If the UniqueIDs are the same, the sales transaction can be completed by transferring funds from the RFID tag to the sales merchant. With the completion of the sales transaction, the sales terminal returns to an inactive state.

There may be an option to add a balance in advance of attending the event e.g. at the time of registration a consumer may opt to add $100 that can then be used via the RFID tag to purchase different items being vended at the event. Thus when the consumer arrives at the conference and is given the RFID wristband it includes a privilege to spend $100 at the different sales areas setup at the venue.

There may be one or more terminals dedicated for RFID tag top-up at the event. The consumer may first be able to check the balance on their RFID wristband by tapping the RFID tag at the RFID reader associated with the top-up terminal. The consumer may add more funds to the RFID tag balance for later use. The RFID top-up terminal may be self-serve or the consumer may be assisted by an operator. In either case when a consumer tops-up the RFID tag, the consumer is required to confirm the transaction with a second tap of the RFID tag to the reader of the RFID tag top-up terminal.

The age of the bearer of the RFID tag may also be verified. For example an event like a conference may have products or services for sale that are age restricted e.g. sale of alcohol at a bar. Thus it is important to check the age of a consumer before the sale of an alcoholic beverage. The RFID tag may preferably contain the age or date of birth information about the consumer. Alternatively the server may also store this information so that when an RFID tag is read by the RFID reader at the sales terminal in the bar, the age is verified before allowing a sales person to add any products to the sales transaction. The age verification may be done by using the UniqueID of the RFID tag, connecting to the server and querying the server for the age information before allowing a sales person to add any age restricted products to the sales transaction.

The RFID tag may also be used to check for associated zone restrictions/privileges. For example an event like a conference may be divided into one or more zones. The various zones in a conference may be required in order to segregate the consumers based on their roles or payment levels. For example a tradeshow may have a press conference area that is only accessible to persons associated with the press, and any products/services being vended in this zone may only be purchased by these people. The RFID tag may preferably contain this information that defines the zone(s) where the RFID tag is valid. Alternatively the server may also store this information so that when an RFID tag is read by an RFID reader at a sales terminal it can verify the zone restrictions/privileges by connecting to the server and querying the UniqueID of the RFID tag and checking its restrictions/privileges before allowing a sales person to add any products to the sales transaction.

According to a first aspect of the invention, a wearable RFID device is provided for use in an event-based interrogation zone. The zone contains terminals with RFID readers. The device includes an element worn by a user, and an attached or embedded RFID tag. The tag has stored data representing a UniqueID of the tag, and a stored funds balance. The tag is programmed for activating an otherwise inactive one of said terminals upon presentation of the tag to the RFID reader of said terminal in a first tap, and then communicating its UniqueID to the terminal for validation. The tag is further programmed, upon validation, and following a second tap of the tag at the RFID reader, for having its stored funds balance changed by the amount of a transaction run through said terminal.

As used herein, the term "interrogation zone" refers to the overall event space populated with terminals actively or passively waiting for tags to read (or "interrogate").

The wearable element of the RFID device may be, for example, a wristband, or a wearable event pass or badge. In certain embodiments, for certain applications, the wearable element may be a disposable element. For example, the device may be made of low cost materials, recyclable or bio-degradable materials, or materials otherwise intended for short term use (e.g. for concert or festival wristbands). However, in some embodiments, for certain applications, more robust materials may be preferred (e.g. season passes intended to last a full season or over multiple events).

The RFID tag may be, for example, an ICODE SLI2 16693 tag or an ICODE SLI2 15693 tag.

Various transaction types are contemplated. The transaction may be a sales transaction for a good or service. The transaction may also be an admission to an event within the interrogation zone, or to a restricted access area of the interrogation zone. The transaction may be a top-up transaction to add funds to the stored funds balance. The transaction may be a cash-out transaction to cash out or transfer to another account or another device funds from the stored funds balance.

In keeping with the event-based nature of the device, the device may be further programmed to deactivate or hibernate after a predetermined time, or following the event.

The stored data on the device may further include at least one credential, such as an age or date of birth credential, or an access or privilege credential. Preferably, such credential is communicated to the terminal at either the first tap or the second tap. A specified credential or range of credential may be necessary for the transaction to be completed, e.g. for a transaction initiated in an age-restricted area, or a sales transaction for an age-restricted product or service, such as an alcoholic beverage. Other types of age-restricted goods and services may include Mature rated video games, adult toys or publications, lottery or gambling products or services, or access to adult-only lounges, beer gardens, etc.

According to a second aspect of the invention, a temporary installation of a system of RFID-based terminals and user-worn RFID devices is provided within an event interrogation zone. A plurality of terminals are temporarily installed in the zone. Each terminal has an active RFID reader, and is in communication with a server. A plurality of RFID devices are issued to users wishing to enter the zone. Each RFID device has an element worn by a user and an attached or embedded RFID tag having stored data representing a UniqueID of the tag, and a stored funds balance. The terminals are programmed for activating upon presentation by a user of the RFID tag of one of the RFID devices to the RFID reader using a first tap. The UniqueID of the RFID tag is retrieved. The RFID tag is then validated by comparing the retrieved UniqueID to a database of valid UniqueIDs stored on a server in communication with the terminal. Transaction particulars are input through the terminal. The transaction is processed after the validated RFID tag is presented to the RFID reader of the terminal in a second tap. This processing includes altering the stored funds balance on the RFID tag.

In one preferred embodiment, the readers and tags use an Active Reader Passive Tag (ARPT) system.

DETAILED DESCRIPTION

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation.

It should also be understood that many components and items are illustrated and described as if they were hardware elements. However, in at least one embodiment, the components comprised in the method and tool are actually implemented in software.

The present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. In order to provide a context for the various aspects of the disclosed invention, as well as the following discussion are intended to provide a brief, general description of a suitable environment in which the various aspects of the disclosed invention may be implemented. While the invention has been described in the general context of computer-executable instructions of a program that runs on one or more computers, the invention also may be implemented in combination with other program modules. Generally, program modules include routines, programs, components, data structures, etc. that perform particular tasks and/or implement particular abstract data types. Moreover, it will be appreciated that the system and method may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch or other electronic gadgets incorporating the capacity to compute), microprocessor-based or programmable consumer or industrial electronics, and the like. The illustrated aspects may also be practiced in distributed computing environments where tasks/routines/processes etc. are performed by remote processing devices that are linked through a communications network e.g. a local area network (LAN) or the Internet. However, some, if not all aspects of the invention may be practiced on stand-alone computer(s). In a distributed computing environment, program modules may be located in both local and remote memory storage devices.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at run-time many common behaviours that other programming languages might perform during compilation. JavaScript, PHP, Perl, Python and Ruby are examples of dynamic languages. Additionally computer code may also be written using a web programming stack of software, which may mainly be comprised of open source software, usually containing an operating system, Web server, database server, and programming language. Some embodiments may use well-known open-source Web development platforms using Linux, Apache, MySQL and PHP. Other examples of environments and frameworks using which computer code may also be generated are Ruby on Rails which is based on the Ruby programming language, or node.js which is an event-driven server-side JavaScript environment. In the present case, the code is specialized to execute functions described herein which enable a smoother and more efficient technological process.

Computing devices e.g. terminals or readers that enable a user to engage with the invention in general may include a memory for storing a control program and data, and a processor (CPU) for executing the control program and for managing the data, which includes user data resident in the memory and includes buffered content. The computing device may be coupled to a video display such as a television, monitor, or other type of visual display while other devices may have it incorporated in them (iPad, iPhone etc.). An application or an app or other simulation may be stored on a storage media such as a USB memory key, flash memory, or other type of memory media all collectively referred to as "removable media" in this disclosure. The app may also be downloaded from the internet. The removable media can be inserted to the console of a computing device where it is read. The console can then read program instructions stored on the removable media and present a user interface to the user. The user interface may preferably be a graphical user interface (GUI).

Figure 1:
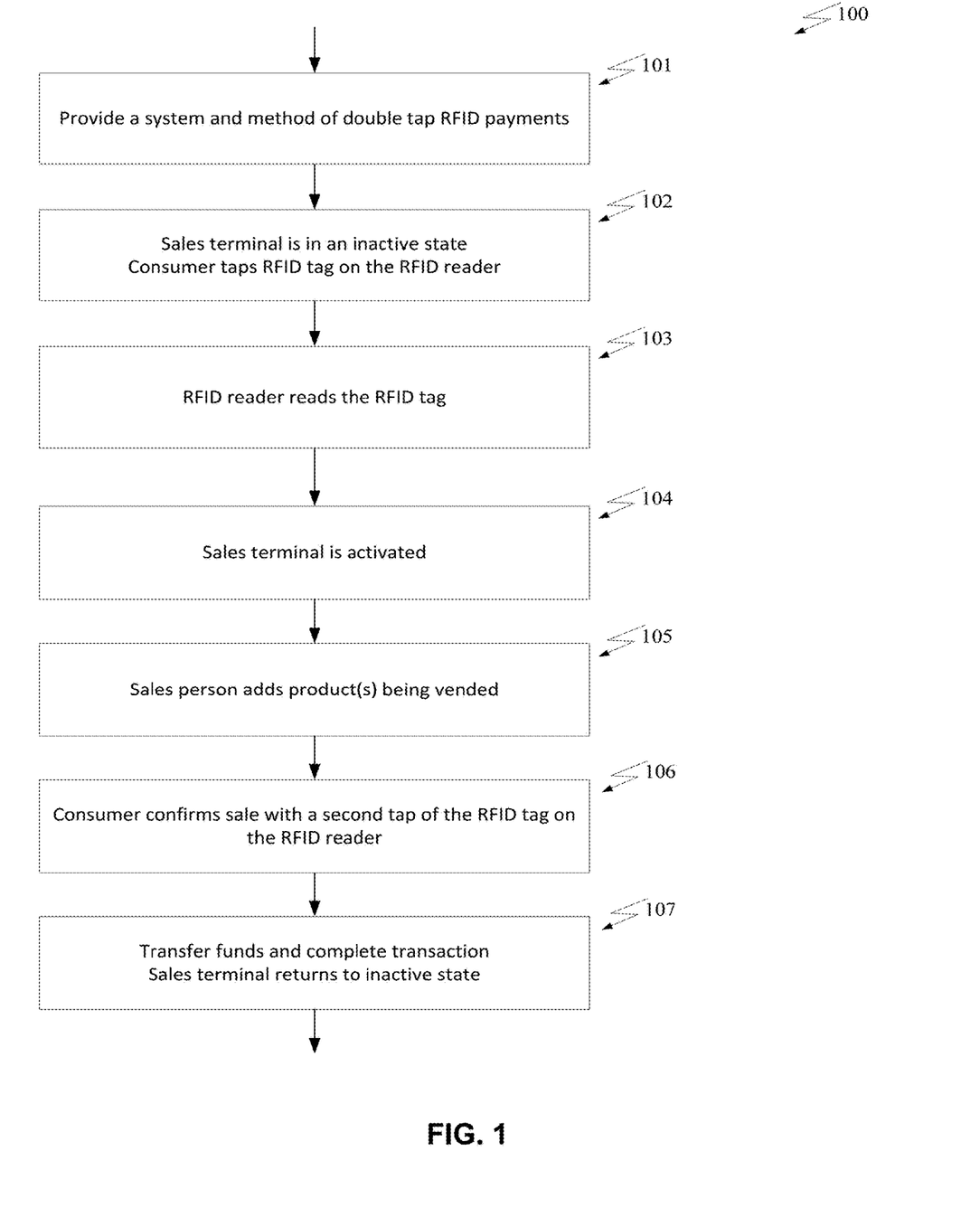
FIG. 1 is a flow diagram illustrating a basic payment method using the present wearable RFID device.

FIG. 1 shows a basic outline of the present method 100, in which a system and method of double tap RFID payments is provided 101.

Electronic touchless, cashless payments are enabled using RFID tags embedded in wristbands or similar wearable items. An RFID tag may be embedded in a wristband or a similar wearable item, which is given to a consumer when visiting a certain event e.g. a conference or a tradeshow. The venue/event may be setup with one or more sales terminals with RFID readers, one or more RFID top-up terminals with RFID readers and a connected server that stores the UniqueIDs of the RFID tags, associated balances, age information, zone restriction/privileges information etc. The server is accessible by the sales terminals and the top-up terminals over a network for example a local area network (LAN).

There may be an option to add a balance in advance to attending the event. For example, at the time of registration a consumer may opt to add $100 that can then be used via the RFID tag to purchase different items being vended at the event. Thus when the consumer arrives at the conference and is given the RFID wristband, it includes a privilege to spend $100 at the different sales areas setup at the venue.

The sales terminal preferably starts in an inactive state. The consumer taps the RFID tag to the RFID reader 102. The sales terminal may be set to default to in an inactive state in order to prevent a sales person from adding any unwanted products and services to the sales transaction before a consumer starts the process.

The event e.g. a tradeshow may have several sales terminals setup from where consumers may purchase products e.g. a lunch kiosk from where sandwiches and drinks can be purchased, a literature kiosk from where books and magazines may be purchased etc. The event may also have one or more RFID tag top-up terminals set up at the venue location so that a consumer may opt to add more balance to the RFID tag if the balance runs low as a consequence of having purchased several products/services.

The system may use standardized RFID tags (ICODE SLI2 15693 on 13.56 MHz (HF)), the most common tag type for inventory tracking.

RFID tags contain at least two parts: an integrated circuit for storing and processing information, modulating and demodulating a radio-frequency (RF) signal, collecting DC power from the incident reader signal, and other specialized functions; and an antenna for receiving and transmitting the signal. The tag information is stored in a non-volatile memory. The RFID tag includes either a chip-wired logic or a programmed or programmable data processor for processing the transmission and sensor data, respectively.

Such RFID tags have a memory which has two sectors: the ROM (read only memory) and the R/W (read/write) memory. The ROM is to store the UniqueID (also known as UID) of the RFID tag, this information is burnt to the ROM at the time of manufacturing and cannot be changed later. The second sector of the memory is a R/W memory, here transactional information is stored e.g. information such as balance, one or more previous transactions, zone restrictions, age limit, etc. Such information may be preferably stored in an encrypted format. The preceding list of items stored on the RFID tag is exemplary and the invention is not limited to these examples.

The RFID reader reads the RFID tag 103. An RFID reader transmits an encoded radio signal to interrogate the RFID tag. The RFID tag receives the message and then responds with its identification and other information. This may be only a unique tag serial number, or may be product-related information such as a stock number, lot or batch number, production date, or other specific information. In case of the double tap payment method, the balance is written to the RFID tag in addition to some other information like balance, age limit and zone restrictions etc.

Signaling between the reader and the RFID tag may be done in several different ways, depending on the frequency band used by the RFID tag. RFID tags operating on LF (Low Frequency) and HF (High Frequency) bands are, in terms of radio wavelength, very close to the reader antenna because they are only a small percentage of a wavelength away. An RFID tag is electrically coupled with the transmitter in the reader. The RFID tag can modulate the field produced by the reader by changing the electrical loading the tag represents. By switching between lower and higher relative loads, the RFID tag produces a change that the RFID reader can detect. At UHF (Ultra High Frequency) and higher frequencies, the RFID tag is more than one radio wavelength away from the reader, requiring a different approach.

When written into the RFID tag by an RFID printer, the tag contains a 96-bit string of data. The first eight bits are a header which identifies the version of the protocol. The next 28 bits identify the organization that manages the data for this tag; the organization number is assigned by the EPC-Global consortium. The next 24 bits are an object class, identifying the kind of product; the last 36 bits are a unique serial number for a particular tag. These last two fields are set by the organization that issued the RFID tag. Similar to a URL, the total electronic product code number can be used as a key into a global database to uniquely identify a particular product.

Generally, the read range of an RFID tag is limited to the distance from the reader over which the tag can draw enough energy from the RFID reader field to power the tag. RFID tags may be read at longer ranges than they are designed for by increasing reader power.

Tapping the RFID tag activates the sales terminal 104. In one embodiment the sales terminal is only activated once a valid RFID tag has been tapped at the RFID reader by a consumer. This prevents a sales person from fraudulently adding any items unwanted by the consumer to the order.

The sales terminal may also be activated when a non-valid tag is tapped, and it may display a message "invalid tag".

In other embodiments the sales terminal may only be activated for a sales transaction once a valid and non-zero balance RFID tag has been tapped.

The sales person then adds transaction particulars, including the products being vended 105. The sales person adds products and/or services that the consumer wants.

The consumer then confirms the sale with the second tap of the RFID tag to the RFID reader 106. In one embodiment, the second tap of the RFID tag to the RFID reader acts to confirm the consumer's intent and willingness to purchase the products/services being vended. This eliminates the accidental RFID scan loophole that may be used by a consumer later to claim a chargeback.

Funds are then transferred and the transaction is completed. The sales terminal returns to inactive state 107. In order to complete the sales transaction the funds may be transferred from the consumer's account (balance on the RFID tag) to the vendor's account. The sales terminal returns to an inactive state with the RFID reader waiting for the next scan of an RFID tag to start a new transaction.

Figure 2A:
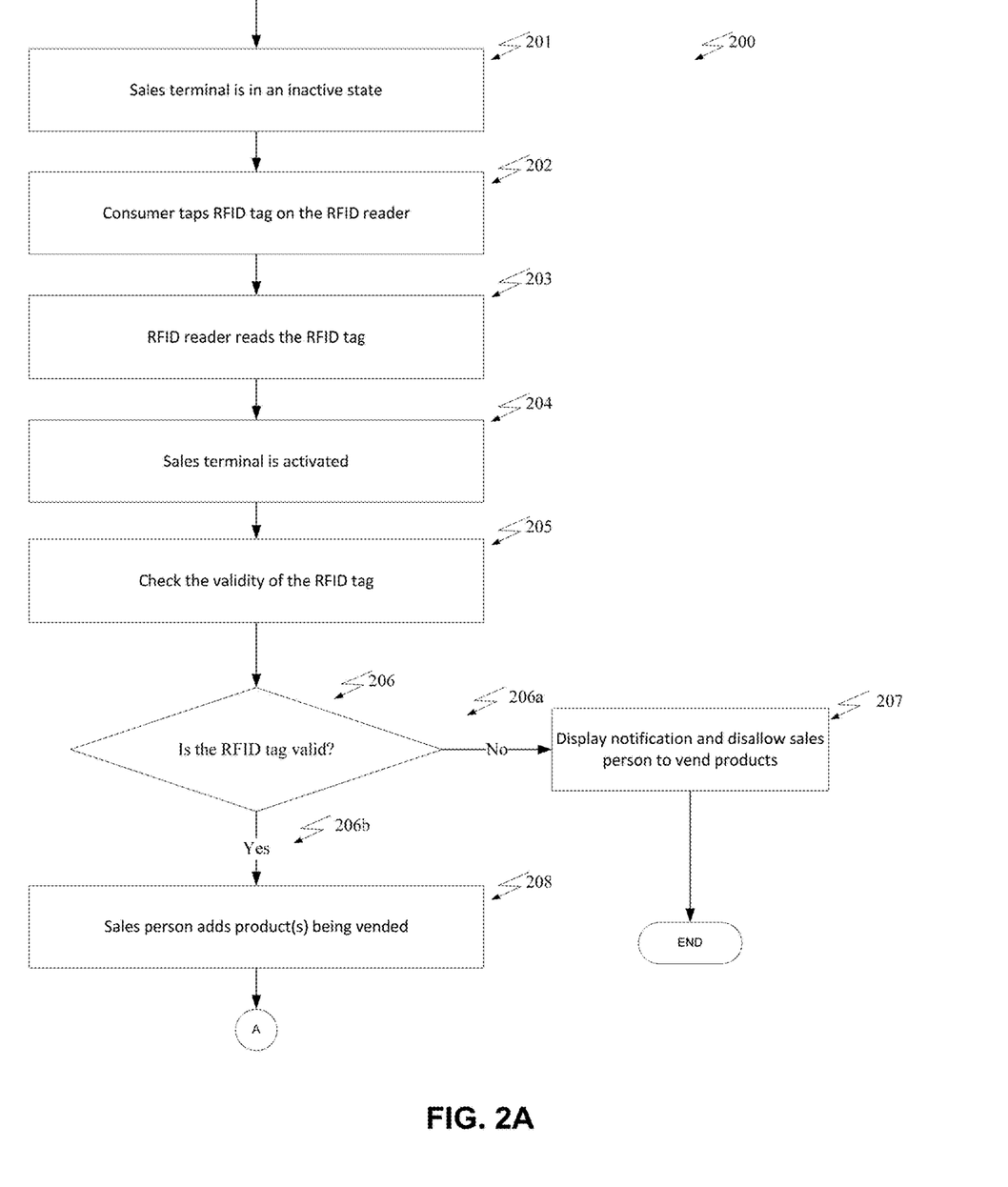
FIGS. 2A and 2B are flow diagrams (FIG. 2B follows from FIG. 2A) illustrating the payment method with additional validation steps.

FIG. 2 shows some further details of the interaction of the consumer with the RFID reader at the sales terminal. The sales terminal is in an inactive state 201. The consumer taps the RFID tag on the RFID reader 202.

The RFID reader reads the RFID tag 203. The sales terminal is activated 204. In one embodiment the sales terminal is only activated once a valid RFID tag has been tapped at the RFID reader by a consumer.

The validity of the RFID tag is checked 205. In one embodiment the validity of the RFID tag is checked by reading its UniqueID and passing this UniqueID to the server for validation. The server may have a database or a list of all valid UniqueIDs for the RFIDs that are related to an event e.g. a conference or a trade show.

The system checks whether the RFID tag is valid 206. In one embodiment if the UniqueID of an RFID tag is listed in the database on the server then the RFID is considered to be valid.

If No 206a, the RFID tag is not valid, then a notification is displayed and the sales person is disallowed from vending products 207. The sales terminal is returned to an inactive state.

In one embodiment if the UniqueID of the RFID tag does not match with any of the UniqueIDs in the list/database on the server then it is considered that the RFID tag is not valid. The sales terminal returns to an inactive state with the RFID reader waiting for the next RFID tag to be read. This prevents a sales person from vending any products to a consumer bearing an invalid RFID tag.

If Yes 206b, the RFID tag is valid, the sales person is allowed to vend product(s). In one embodiment if the UniqueID of the RFID tag matches with at least one of the UniqueIDs in the list/database on the server, this implies that the RFID tag is valid. The sales person is allowed to add product(s) being vended to consumer via the sales terminal 208.

The system checks if the value (price) of the vended product(s) is less than the balance on the RFID tag 209, 210. This may be determined from an initial check for the balance associated with the UniqueID of the RFID tag. The balance may be stored on the RFID tag itself and may also be verified by checking for the balance associated with this RFID tag UniqueID stored on the server. Once the transaction is allowed to proceed, this value (price) of the product(s) being vended (including tax) is deducted from the balance associated with the RFID tag UniqueID.

If No 210a, the balance on the RFID tag (or balance associated with the RFID tag) is less than the value of the vended product(s) the sales person is disallowed to add more product(s) to the transaction 211.

If Yes 210b, the value of the vended product(s) is less than the balance on the RFID tag the sales person is allowed to add more vended product(s) to the sales transaction 212 (as long as the customer wants more products).

Figure 2B:
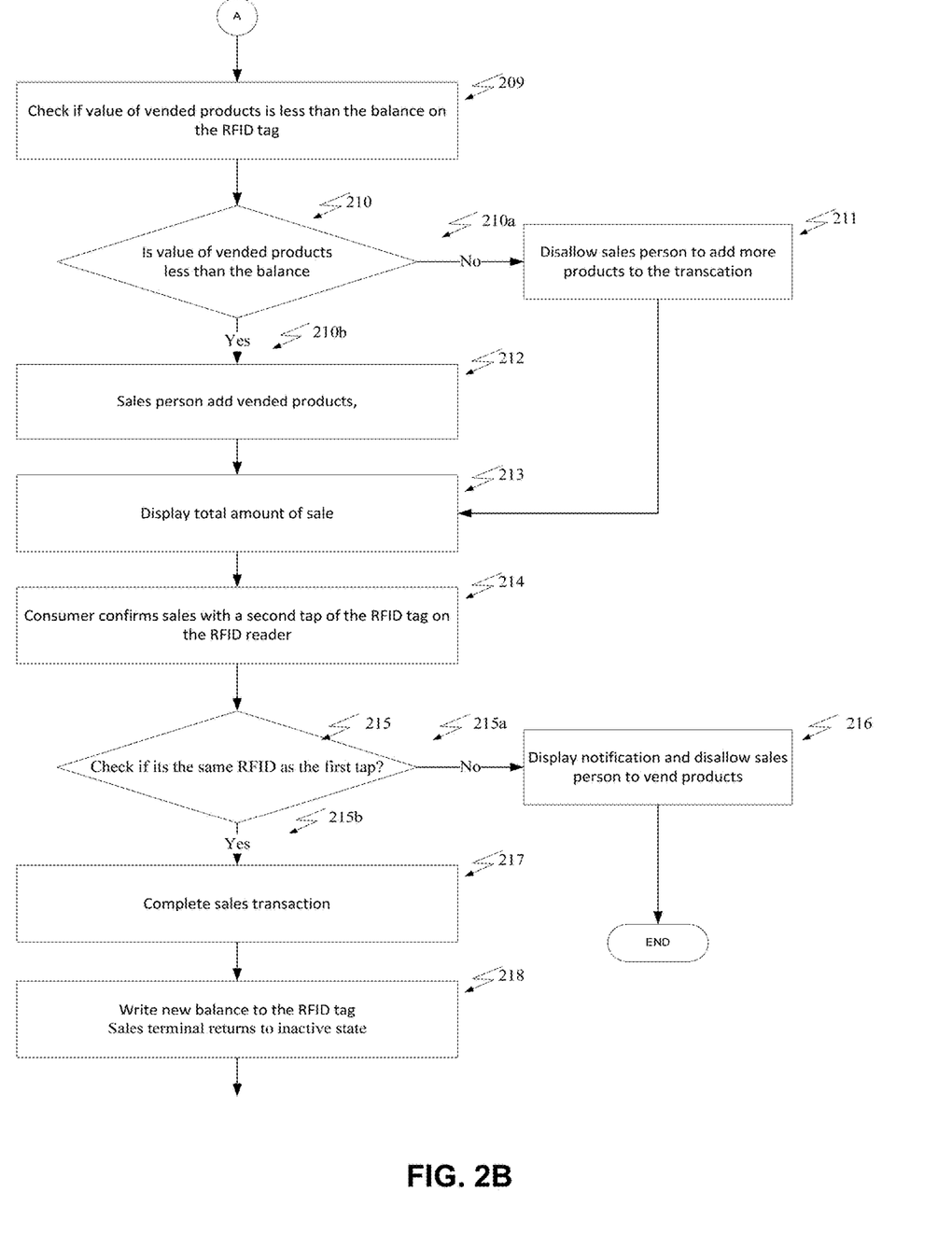

The total amount of the sale may be displayed 213. The consumer can then confirm the sale with a second tap of the RFID tag to the RFID reader 214. In one embodiment, the second tap of the RFID tag to the RFID reader associated with the sales terminal confirms the consumer's intent and willingness to purchase the products/services being vended (i.e. a "commit" tap).

The system may check if it is the same RFID tag as the first tap 215. When the consumer taps the RFID tag a second time, the RFID tag may be read to get the UniqueID of the RFID tag. The UniqueID read from the first tap of the RFID tag may be compared with the UniqueID read with the second tap of the RFID tag. If the comparison shows that the UniqueID read from the first tap of the RFID tag is equal to/same as the UniqueID read with the second tap then it is confirmed that it is the same consumer who initiated the sales transaction.

If No 215a, the RFID tag of the second tap is different from the RFID tag of the first tap, then a notification may be displayed and the sales person may be disallowed to vend product (i.e. the transaction is blocked) 216. If the comparison shows that the UniqueID read from the first tap of the RFID tag is not equal to/or is different from the UniqueID read with the second tap then it is concluded that a different consumer is trying to finalize the sales transaction.

If Yes 215b, the RFID tag of the second tap is the same as the RFID tag of the first tap then complete the sales transaction may be completed 217. If the comparison results that the UniqueID read from the first tap of the RFID tag is equal to/same as the UniqueID read with the second tap then the sales transaction may be completed. In one embodiment in order to complete the sales transaction the funds must be transferred from the consumer's account (stored funds balance on the RFID tag) to the vendor's account.

A new balance is written to the RFID tag 218. If there is any balance left from this instant transaction the balance is written to the RFID tag and the server. If the balance is zero, then a 0.00 balance may be written to the RFID tag and the server. With the completion of a sales transaction the sales terminal may return to an inactive state with the RFID reader waiting for the next scan of an RFID tag to start a new sales transaction.

Figure 3:
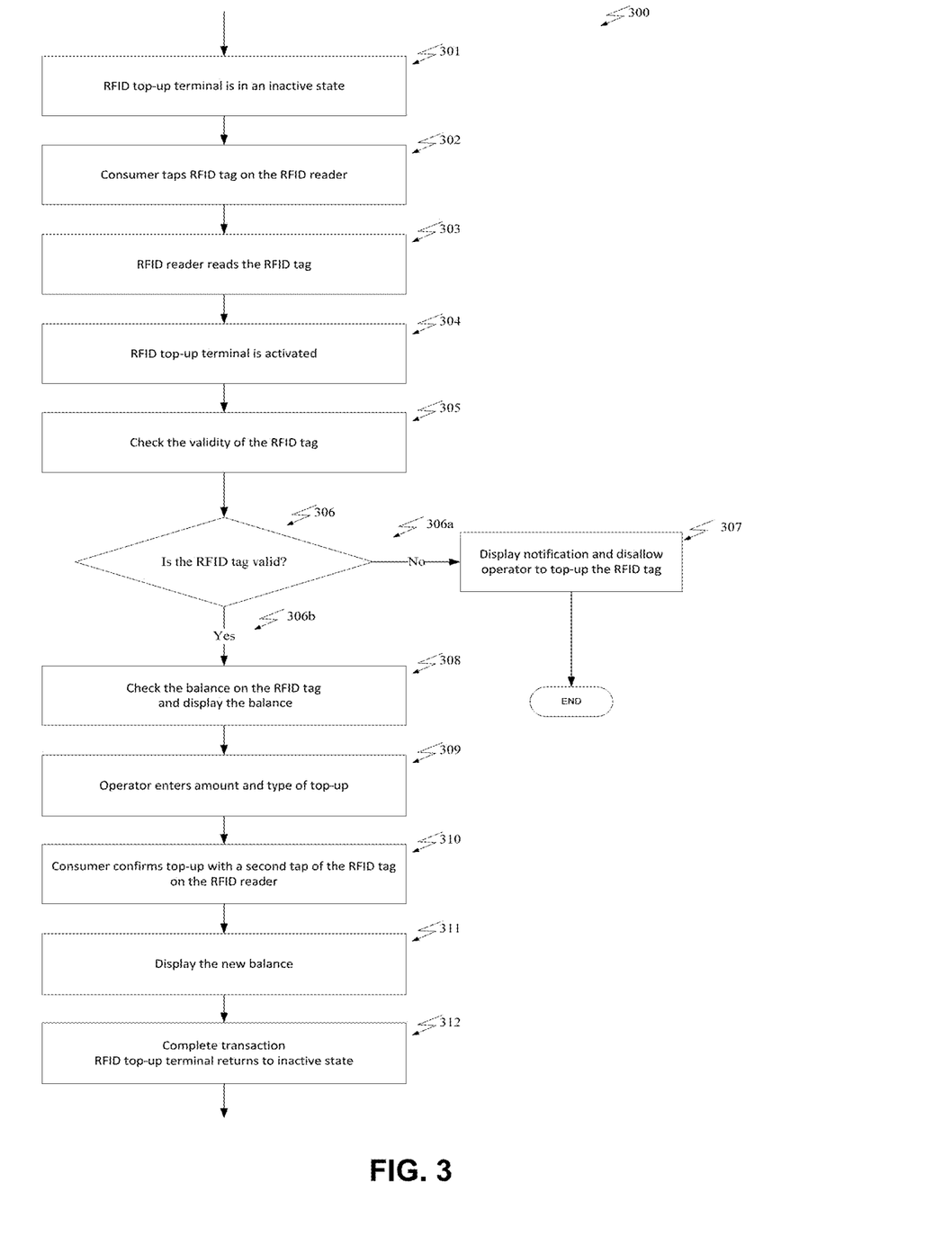
FIG. 3 is a flow diagram illustrating a sample top-up process.

FIG. 3 shows one embodiment describing a RFID tag top-up process 300. There may be one or more terminals dedicated for RFID tag top-up (or sales terminals could also be used for this purpose). The consumer may preferably first be able to check the balance on their RFID tag by tapping the RFID tag at the RFID reader associated with the top-up terminal. Preferably the consumer may add more balance to the RFID tag via the top-up terminal for later use.

In a preferred embodiment a graphical user interface may be provided, using which a consumer may top up the balance on the RFID tag. Preferably there may be a drop down menu or a list with selection radio buttons or any other user friendly method using which a consumer may choose the amount and the payment method for the RFID tag top-up e.g. credit card, bank account etc.

RFID tag top-up terminal is in an inactive state 301. Consumer taps RFID tag on the RFID reader 302 associated with the top-up terminal. RFID reader reads the RFID tag 303.

RFID tag top-up terminal is activated 304. In one embodiment of the invention the RFID tag top-up terminal is only activated once a valid RFID tag has been tapped at the RFID reader by a consumer.

The validity of the RFID tag is checked 305. In one embodiment the validity of the RFID tag is checked by reading its UniqueID and passing this UniqueID to the server for validation. The server may have a database or a list of all valid UniqueIDs for the RFIDs that are related to an event, the associated balances, a list of recent transactions, age and zone restrictions if any amongst other information about the bearer of the RFID tag.

The system checks whether the RFID tag is valid 306, e.g. by querying the server. If No 306a, the RFID tag is not valid, then a notification may be displayed and an operator may be disallowed to top-up the RFID tag 307. The sales terminal can be returned to an inactive state.

In one embodiment there may be a person e.g. an operator (or sales person) who assists a consumer with the RFID tag top-up process. In another embodiment the RFID tag top-up terminal may be self-serve where the consumers follow instructions to top-up the RFID tags themselves.

In one embodiment if the UniqueID of the RFID tag does not match with any of the UniqueIDs in the list/database on the server then it is considered that the RFID tag is not valid. The RFID tag top-up terminal returns to an inactive state with the RFID reader waiting for the next RFID tag to be read. This prevents a person whether an operator or consumer from adding a balance to an RFID tag that is invalid.

If Yes 306b, the RFID tag is valid, the balance associated with the RFID UniqueID may be checked and displayed 308. If the UniqueID of the RFID tag matches with at least one of the UniqueIDs in the list/database on the server, this implies that the RFID tag is valid. The operator may be allowed to enter the amount and the type of top-up transaction 309.

The consumer confirms the RFID tag top-up with a second tap of the RFID tag to the RFID reader 310. The second tap of the RFID tag to the RFID reader associated with the top-up terminal thus confirms the consumer's intent and willingness to top-up the RFID tag with the amount and type chosen earlier.

The system checks whether the RFID tag of the first tap is the same as the RFID tag of the second tap. If the comparison shows that the UniqueID read from the first tap of the RFID tag is equal to/same as the UniqueID read with the second tap then complete the top-up transaction. In order to complete the top-up transaction the funds may be transferred from the consumer's account e.g. a credit card to the RFID tag.

The new balance is displayed 310 and the new balance is written to the RFID tag. The new balance may also be written to the server.

In one embodiment the last transaction details and the balance may be written to the RFID tag. In one embodiment the RFID tag may store the last five transactions, and the balance.

The RFID tag top-up transaction may be completed 311 and return the RFID tag top-up terminal returned to an inactive state with the RFID reader waiting for the next scan of an RFID tag to start a new top-up transaction.

Figure 4:
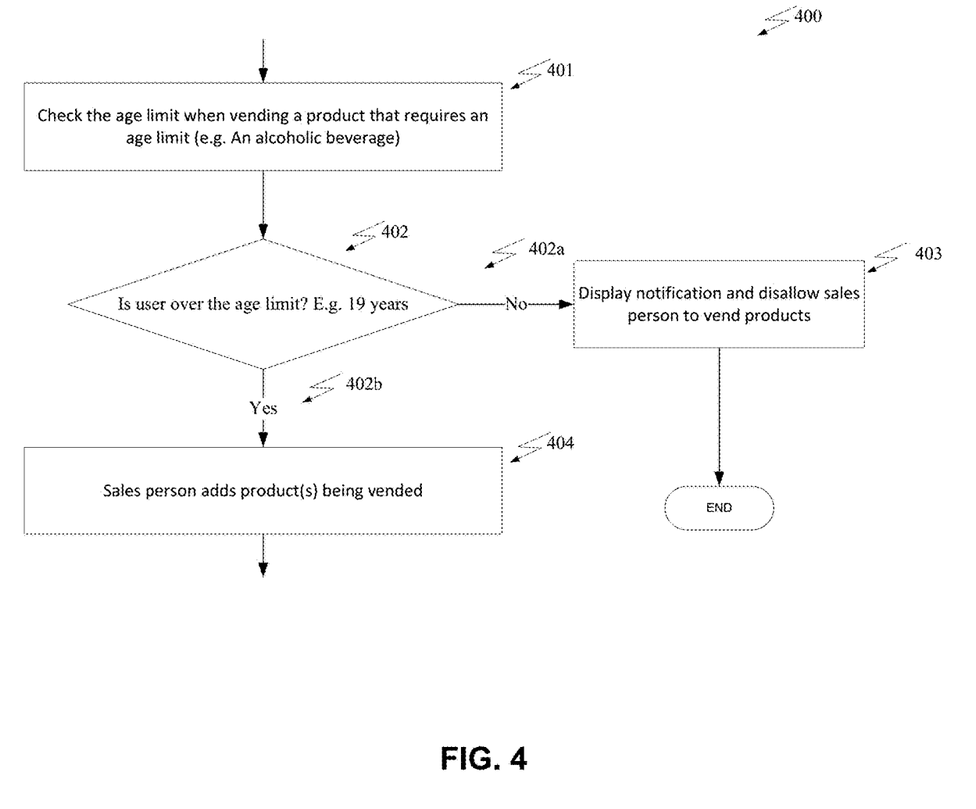
FIG. 4 is a flow diagram illustrating a sample age-verification process.

FIG. 4 shows one embodiment 400. In one embodiment the system may optionally check the age of the RFID tag bearer (consumer) 401.

The event e.g. a conference may have products or services for sale that are age restricted e.g. alcohol. Thus it is important to check the age of a consumer before the sale of an alcoholic beverage.

The RFID tag may preferably contain age or date of birth information about the consumer. Alternatively the server may also store this information so that when an RFID tag is read by the RFID reader at the sales terminal the age is verified before allowing a sales person to add any products to the sales transaction. The age verification may be done by using the UniqueID of the RFID tag, connecting to the server and querying the server for the age information before allowing a sales person to add any age restricted products to the sales transaction.

In one embodiment the server may preferably store the age or date of birth information about the consumer, so that when an RFID tag is read by the RFID reader at the sales terminal the age can be verified before allowing a sales person to add any age resticited products to the sales transaction. Alternatively the RFID tag may also store the age and date of birth information about the consumer.

The system checks whether the bearer of the RFID tag is over the age limit e.g. 19 years 402. If No 402a, the bearer of the RFID tag is not over the age limit then a notification may be displayed and the sales person may be disallowed to vend age restricted products 403.

If Yes 402b, the bearer of the RFID tag is over the age limit, the sales person may be allowed to add age restricted products being vended 404 to the sales transaction.

Figure 5:
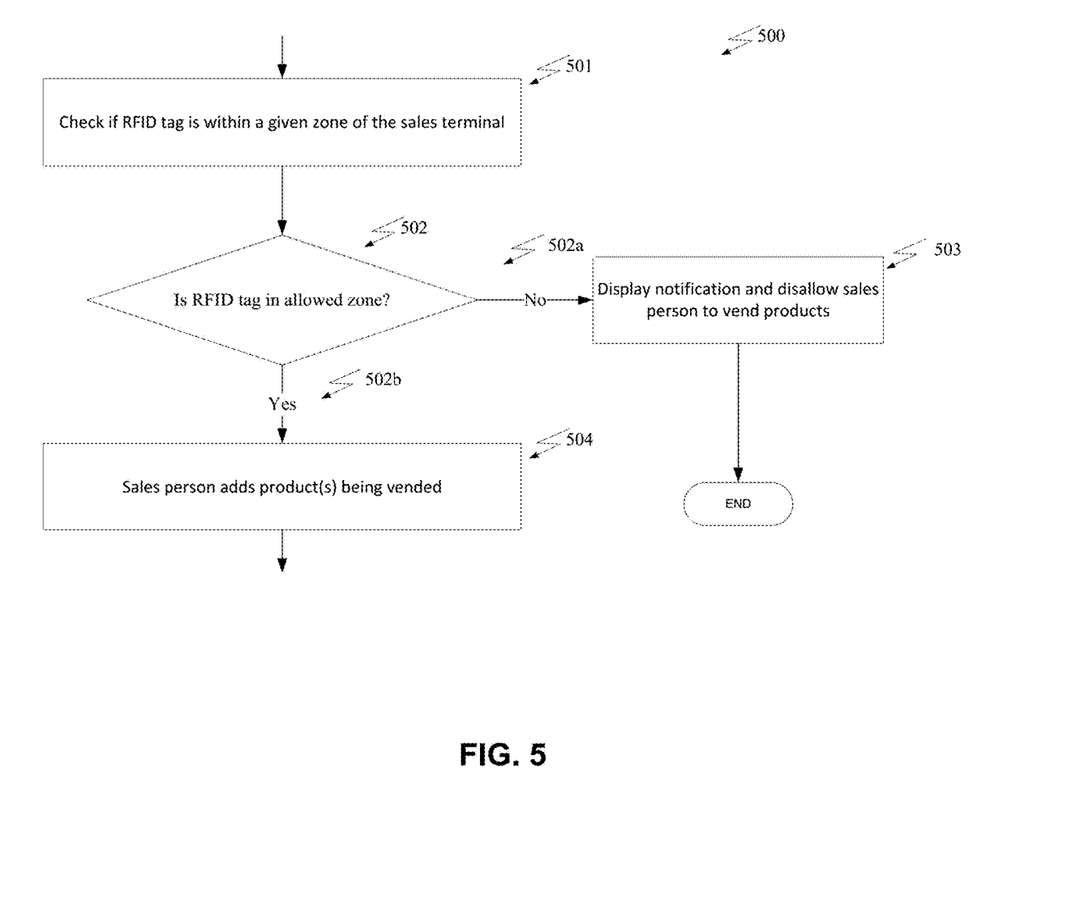
FIG. 5 is a flow diagram illustrating a sample zone-verification process.

FIG. 5 shows one embodiment 500. In one embodiment the system may optionally check if the RFID tag is within a given zone of the sales terminal 501.

The system checks whether the RFID tag is within the allowed zone 502. If No 502a, the RFID tag is not within the allowed zone, a notification may be displayed and the sales person may be disallowed to vend zone restricted products 503.

If Yes 502b, the RFID tag is within the allowed zone, the sales person may be allowed to add zone restricted products being vended 504 to the sales transaction.

The event e.g. a conference may be divided into one or more zones. The different zones in a conference may be required in order to segregate the consumers based on their roles or payment levels. For example a tradeshow may have a press conference area that is only accessible to persons associated with the press, and any products/services being vended in this zone may only be purchased by these people. The RFID tag may preferably contain this information that defines the zone(s) where the RFID tag is valid. Alternatively the server may also store this information so that when an RFID tag is read by an RFID reader at a sales terminal it can verify the zone restrictions/privileges by connecting to the server and querying UniqueID of the RFID tag and checking its restrictions/privileges before allowing a sales person to add any products to the sales transaction.

Figure 6:
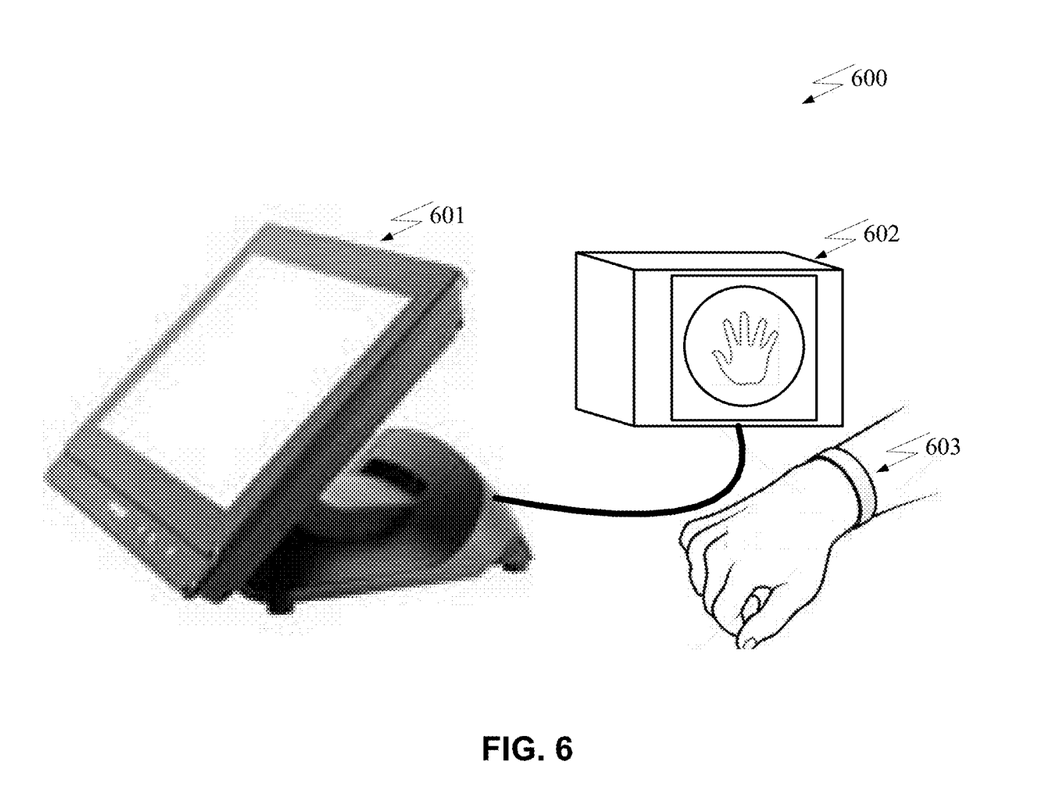
FIG. 6 shows a sample wearable device (here, wristband) in "tapping" communication with an RFID reader portion of a terminal (either sales or top-up).

FIG. 6 shows one embodiment of the wearable RFID device in the context of a transaction within an interrogation zone 600. As shown, in this case, the wearable element is a wristband 603, and the RFID tag is embedded in the wristband. The tag is interrogated by an RFID reader 602 of a sales terminal 601 (and/or top-up terminal). The tag may be readable (through double-tap transactions as provided herein) at any one of multiple terminals in the event space (interrogation zone) (one such terminal shown). A server may be provided (either on- or off-site) to manage, for example, valid UniqueIDs and store transaction data and funds balances of the tags (may be updated at the time of each transaction or at periodic or batch-wise intervals).

The sales terminal may be a self-serve terminal where the consumer may purchase items directly and add items to a sales transaction. In one embodiment of the invention the consumer starts the sales transaction by first tapping the RFID tag to the RFID reader, adding products to the sales transaction and then finalizing the sale with the second tap of the RFID tag to the RFID reader.

In one embodiment the details of the several previous transactions may be stored on the RFID tag.

The RFID tags may be customized before usage. In an alternate embodiment of the invention the system and method of the invention may use generic RFID tag for example RFID tags having an ICODE SLI2 15693.

One embodiment uses an Active Reader Passive Tag (ARPT) system that has an active reader, which transmits interrogator signals and also receives authentication replies from passive RFID tags.

The RFID tags may be embedded in any kind of item that it is wearable e.g. a wristband, an ankle-band, a pair of sunglasses, a wearable (lanyard based, pinned or clippable) badge or pass, etc.

The UniqueIDs (UIDs) of RFID tags to be used at an event may be stored on the connected server. In the preferred embodiment the list of UIDs may be available in a CSV (Comma Separated Values) format from the supplier. This CSV file can then be uploaded to the server. The system then automatically initializes the RFID tags by creating a unique encryption method for that specific tag and writes the offline information to the memory of the RFID tag when the RFID tag first read by an RFID reader in the system.

These descriptions exemplify only some of the several possible embodiments of the invention and are not meant to be exhaustive.

It should be understood that although the term application has been used as an example in this disclosure but in essence the term may also imply to any other piece of software code where the embodiments are incorporated. The software application can be implemented in a standalone configuration or in combination with other software programs and is not limited to any particular operating system or programming paradigm described here.

The computer program comprises: a computer usable medium having computer usable program code, the computer usable program code comprises: computer usable program code for presenting graphically to the users options for scrolling via the touch-screen interface.

The examples noted here are only for illustrative purposes and there may be further implementation embodiments possible with a different set of components. While several embodiments are described, there is no intent to limit the disclosure to the embodiment or embodiments disclosed herein. On the contrary, the intent is to cover all practical alternatives, modifications, and equivalents.

What is claimed is:

1. A wearable RFID device for use in an event-based interrogation zone, the zone containing terminals with RFID readers, the device comprising:
    an element worn by a user; and
    an attached or embedded RFID tag having a memory having a first sector with a read-only memory storing a UniqueID of the tag, and a second sector with a read-write memory storing stored data including a stored funds balance;
    the tag having a printed logic circuit, the circuit being programmed for activating an initially inactive one of said terminals upon presentation of the tag to the RFID reader of said terminal in a first tap, and communicating its UniqueID to the terminal for validation; and
    the circuit being further programmed, upon validation, and following a second tap of the tag at the same RFID reader, for having the stored funds balance of the tag's read-write memory changed by the amount of a transaction run through said terminal between the first tap and the second tap, the terminal returning to inactive after the tag is removed.

2. The wearable RFID device of claim 1, wherein the element is a wristband.

3. The wearable RFID device of claim 1, wherein the element is a wearable event pass or badge.

4. The wearable RFID device of claim 1, wherein the element is a disposable element.

5. The wearable RFID device of claim 1, wherein the RFID tag is an ICODE SLI2 16693 tag or an ICODE SLI2 15693 tag.

6. The wearable RFID device of claim 1, wherein the transaction is a sales transaction for a good or service.

7. The wearable RFID device of claim 1, wherein the transaction is an admission to an event within the interrogation zone.

8. The wearable RFID device of claim 1, wherein the transaction is an admission to a restricted access area of the interrogation zone.

9. The wearable RFID device of claim 1, wherein the transaction is a top-up transaction to add funds to the stored funds balance.

10. The wearable RFID device of claim 1, wherein the transaction is a cash-out transaction to cash out or transfer to another account or another device funds from the stored funds balance.

11. The wearable RFID device of claim 1, wherein the tag is further programmed to deactivate or hibernate after a predetermined time, or following the event.

12. The wearable RFID device of claim 1, wherein the stored data further comprises at least one credential.

13. The wearable RFID device of claim 12, wherein the credential is an age or date of birth credential.

14. The wearable RFID device of claim 12, wherein the credential is an access or privilege credential.

15. The wearable RFID device of claim 12, wherein the credential is communicated to the terminal at either the first tap or the second tap.

16. The wearable RFID device of claim 13, wherein the transaction occurs in an age-restricted area.

17. The wearable RFID device of claim 13, wherein the transaction is a sales transaction for an age-restricted product or service.

18. The wearable RFID device of claim 13, wherein the transaction is a sales transaction for an alcoholic beverage.

19. The wearable RFID device of claim 1, wherein the adjusted stored funds balance is written to the read-write memory of the tag.

20. The wearable RFID device of claim 1, wherein the stored data includes a link to transaction data stored offsite.

21. The wearable RFID device of claim 1, wherein all stored data is stored directly in the read-write memory of the tag.

22. A temporary installation of a system of RFID-based terminals and user-worn RFID devices within an event interrogation zone, the installation comprising:
    a plurality of terminals temporarily installed in the zone, each terminal having an active RFID reader, and being in communication with a server;
    a plurality of RFID devices issued to users wishing to enter the zone, each RFID device comprising:
        an element worn by a user; and
        an attached or embedded RFID tag having a memory having a first sector with read-only memory storing a UniqueID of the tag, and a second sector with a read-write memory storing stored data including a stored funds balance;
    the initially inactive terminals being programmed for:
    activating upon presentation by a user of the RFID tag of one of the RFID devices to the RFID reader using a first tap, and retrieving the UniqueID of the RFID tag;
    validating the RFID tag by comparing the retrieved UniqueID to a database of valid UniqueIDs stored on a server in communication with the terminal;
    receiving input of transaction particulars through the terminal;
    processing the transaction after the validated RFID tag is presented to the RFID reader of the terminal in a second tap, the processing including altering the stored funds balance on the read-write memory of the RFID tag; and
    inactivating the terminal after the tag is removed.

23. The temporary installation of claim 22, wherein the readers and tags use an Active Reader Passive Tag (ARPT) system.

24. The temporary installation of claim 22, wherein the terminals are further programmed for disallowing input of transaction particulars while the terminal is inactive.

* * * * *